United States Patent [19]

Bringley et al.

[11] Patent Number: 5,641,967

[45] Date of Patent: Jun. 24, 1997

[54] RADIOGRAPHIC PHOSPHOR PANEL HAVING OXOSULFUR FUNCTIONALIZED POLYMER REDUCING AGENTS

[75] Inventors: Joseph F. Bringley; Barbara J. Fisher, both of Rochester; Philip Steven Bryan, Webster; Wayne Arthur Bowman, Walworth, all of N.Y.

[73] Assignee: Eastman Kodak Company, Rochester, N.Y.

[21] Appl. No.: 454,802

[22] Filed: May 31, 1995

[51] Int. Cl.$^6$ .............................. G21K 4/00; C09K 11/61
[52] U.S. Cl. .............................. 250/484.4; 252/301.4 H
[58] Field of Search ..................... 250/484.4; 428/691; 252/301.4 H

[56] References Cited

U.S. PATENT DOCUMENTS

| | | |
|---|---|---|
| 2,502,529 | 4/1950 | Murray . |
| 2,887,379 | 5/1959 | Blake et al. . |
| 3,023,313 | 2/1962 | De La Mater et al. . |
| 3,072,588 | 1/1963 | Vitkuske et al. . |
| 3,300,310 | 1/1967 | Kennard et al. . |
| 3,300,311 | 1/1967 | Kennard et al. . |
| 3,617,285 | 11/1971 | Staudenmayer . |
| 3,743,833 | 7/1973 | Martic et al. . |
| 3,836,784 | 9/1974 | Bates et al. . |
| 3,958,995 | 5/1976 | Campbell et al. . |
| 4,360,571 | 11/1982 | Rabatin . |
| 4,374,905 | 2/1983 | Rabatin . |
| 4,380,702 | 4/1983 | Takahashi et al. . |
| 4,491,736 | 1/1985 | Tersoka . |
| 4,505,989 | 3/1985 | Umemoto et al. . |
| 4,912,333 | 3/1990 | Roberts et al. . |
| 5,401,971 | 3/1995 | Roberts .................................. 250/484.4 |
| 5,427,868 | 6/1995 | Brinkley et al. ................ 250/484.4 X |
| 5,464,568 | 11/1995 | Bringley et al. ................ 252/301.4 H |
| 5,507,976 | 4/1996 | Bringley et al. ................ 252/301.4 H |

FOREIGN PATENT DOCUMENTS

| | | |
|---|---|---|
| 0 234 385 B1 | 9/1991 | European Pat. Off. . |
| 2 017 140 | 10/1978 | United Kingdom . |

OTHER PUBLICATIONS

Research Disclosure, vol. 184, Aug. 1979, Item 18431, Section I.
Research Disclosure, vol. 176, Dec. 1978, Item 17643, Section XVII.
Research Disclosure, vol. 154, Feb. 1977, Item 15444.
U.S. Patent Application No. 157,797 filed Nov. 24, 1993.
U.S. Patent Application No. 157,796 filed Nov. 24, 1993.
U.S. Patent Application No. 157,583 filed Nov. 24, 1993 and continuation-in-part U.S. Patent Application No. 300,116 filed Sep. 2, 1994.
U.S. Patent Application No. 157,582 filed Nov. 24, 1993 and continuation-in-part U.S. Patent Application No. 300,113 Filed Sep. 2, 1994.

*Primary Examiner*—Edward J. Glick
*Attorney, Agent, or Firm*—Carl O. Thomas

[57] ABSTRACT

A radiographic phosphor panel having oxosulfur functionalized polymer reducing agents. The phosphor panel has a support and a luminescent layer overlaying the support. The luminescent layer includes phosphor crystals, and binder. The oxosulfur functionalized polymer reducing agent is present in a concentration sufficient to substantially increase the photostimulated luminescence of the panel.

19 Claims, No Drawings

RADIOGRAPHIC PHOSPHOR PANEL HAVING OXOSULFUR FUNCTIONALIZED POLYMER REDUCING AGENTS

FIELD OF THE INVENTION

The invention relates to radiographic phosphor panels. The invention more particularly relates to radiographic phosphor panels containing oxosulfur functionalized polymer reducing agents.

BACKGROUND OF THE INVENTION

A radiographic phosphor panel contains a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible light from irradiated phosphor crystals.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

Degradation of final images due to panel discoloration has long been recognized for intensifying screens. There has not, however, been agreement as to the source of that discoloration. What has been noticed is that screens subject to prolonged exposure to photographic film have tended to become discolored. U.S. Pat. Nos. 4,374,905 and 4,360,571 state that the discoloration is due to "volatile organic constituents escaping from the associated photographic film" (U.S. Pat. No. 4,374,905, column 1, lines 40–59 and U.S. Pat. No. 4,360,571, column 1, lines 46–64). Great Britain Patent Application No. GB 2 017 140 A states:

"[I]t has been discovered that screens containing lanthanum-oxy-halide phosphors tend to discolor rapidly when in use and in particular when held in contact with an X-ray film, ...

"Gadolinium-oxy-halides are similar ...

"In spite of intensive research into this discoloration defect the cause of it is not yet clearly known but it appears to be a complex reaction caused, in part at least, by the hydroscopic nature of the lanthanum-oxy-halide phosphors or gadolinium-oxy-halide phosphors, the nature of the binder and the presence of the X-ray film held in contact with the screen for a period of time.

"Furthermore, under somewhat different conditions of use X-ray screens and in particular X-ray screens which contain lanthanum-oxyhalide or gadolinium-oxyhalide phosphors can lose speed due to a different defect which appears to involve only the phosphor. This is hydrolysis of the phosphor which is caused by water present in the phosphor layer due either to atmospheric moisture or aqueous cleaning fluid penetrating the protective layer of the screen. It is thought that quantities of halide or more surprisingly, the free halogen, released by hydrolysis may actually catalyze the discoloration of the binder or of compounds having migrated from the film." (page 1, lines 14–33)

U.S. Pat. No. 4,374,905, to Rabatin, teaches a solution to both discoloration by "volatile organic constituents" and attack by water. The phosphor for an intensifying screen was milled with anhydrous $MgSO_4$ or $ZnSO_4$ (0.5 to 4 weight percent) during preparation of the screen. It was proposed that the protective action was based upon the reaction:

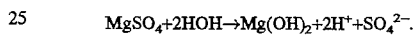

$$MgSO_4 + 2HOH \rightarrow Mg(OH)_2 + 2H^+ + SO_4^{2-}.$$

U.S. Pat. No. 3,836,784, to Bates et al, teaches that small amounts of "stabilizers", such as sodium thiosulfate or potassium thiosulfate can be included in the fluorocarbon binder of an intensifying screen. Bates et al, which used an iodide containing phosphor, noted:

"[A]ctivated iodide phosphors are extremely hygroscopic. Absorption of small amounts of water rapidly reduces the conversion efficiency to a vanishingly small value. In order to employ activated iodide phosphors it is therefore necessary to provide the activated iodide phosphor in the screen in a form in which it remains stable for long periods of time.

"Various ways have been taught for using thallium activated potassium iodide and protecting the iodide from moisture." (Bates et al, column 1, lines 20–30)

U.S. Pat. No. 3,023,313 to De La Mater et al teaches the use of small amounts of sodium thiosulfate or potassium thiosulfate in the binder of an intensifying screen. Examples list 2 grams and 6 grams of sodium thiosulfate per 200 grams of potassium iodide phosphor.

In U.S. Pat. No. 4,360,571, to Rabatin, phosphors were treated with fatty acids or metal salts of fatty acids to prevent discoloration by "volatile organic constituents" and attack by water. In GB 2 017 140 A, intensifying screens were stabilized against discoloration and hydrolysis by incorporation of a compound containing a free epoxy group and, optionally, a dialkyl tin compound such as dibutyl tin diocytl as an additional stabilizer.

Radiation image storage panels, unlike intensifying screens, are subject to degradative losses of both emitted light and stimulating radiation. Since these effects are cumulative, discoloration can be an even more serious issue in storage panels than in intensifying screens.

Yellowing of a phosphor layer of a radiation image storage phosphor panel, in which the phosphor contains iodine, is described in European Patent Specification No. EP 0 234 385 B1. The yellowing is ascribed to liberation of free iodine. The solution taught for the yellowing problem, is incorporation in the phosphor layer of a compound containing a free epoxy group and/or a compound selected from: phosphites, organotin compounds, and metal salts of organic acids, specifically: octylic acid, lauric acid, stearic acid, oleic acid, ricinoleic acid naphthenic acid, 2-ethylhexanoic acid, resin acid, synthetic carboxylic acid, benzoic acid, salicylic acid, organic phosphinous acid, phenol, and alkylphenol.

U.S. patent application Ser. Nos. 157,797 (now abandoned) and Ser. No. 157,796 (now U.S. Pat. No. 5,427,868) both filed on 24 Nov. 1993 and entitled "Pigment Stabilized Radiation Image Storage Panel and Method for Preparing Radiation Image Storage Panel" and "Radiographic Phosphor Panel Having Binder Compatible Oxosulfur Stabilizer and Method for Preparing Phosphor Panel" disclose oxosulfur reducing pigment and binder-compatible oxosulfur compounds and complexes useful for preventing yellowing of phosphor panels.

It would be desirable to provide improved radiation image storage panels with stability against yellowing and/or hydrolysis.

SUMMARY OF THE INVENTION

The invention, in its broader aspects, provides a radiation phosphor panel containing an oxosulfur functionalized polymer. The oxosulfur functionalized polymer acts as a reducing agent. The phosphor panel has a support and a luminescent layer overlaying the support. The luminescent layer includes phosphor crystals capable of absorbing X-radiation. The oxosulfur functionalized polymer reducing agents are present in a concentration sufficient to substantially increase the photostimulated luminescence of the panel.

It is an advantageous effect of at least some of the embodiments of the invention that radiation image storage panels and prompt emission panels are provided which exhibit improved performance and enhanced stabilization against yellowing.

DESCRIPTION OF PARTICULAR EMBODIMENTS

The radiographic phosphor panel of the invention comprises an oxosulfur functionalized polymer reducing agent. The panel consists of a support, a luminescent layer and an optional overcoat layer. The luminescent layer includes phosphor crystals and a binder. The oxosulfur functionalized polymer reducing agent is preferably located in the luminescent layer. The luminescent layer can consist of one or more layers, for example one layer can contain the phosphor crystals and binder and a separate and adjacent layer can contain the oxosulfur functionalized polymer reducing agent. One or more oxosulfur functionalized polymer reducing agents with or without one or more other reducing agents may be present in the radiographic phosphor panel of this invention.

The phosphor crystals in the luminescent layer can be any phosphor crystals that are capable of absorbing X-radiation and emitting electromagnetic radiation of a second wavelength. The phosphor crystals can be those that emit the second wavelength promptly after the absorption of the X-radiation and are used to construct prompt emission panels, or the phosphor crystals can be those that are able to store the absorbed energy and release it after exposure to electromagnetic radiation and are used to construct storage phosphors. The following description is primarily directed to radiographic image storage panels; however, the invention is not limited to storage panels. The term "radiographic phosphor panel" refers to both an image storage panel and a prompt emission panel.

The phosphor in the storage panel can be chosen from radiographic phosphors generally. Halide containing phosphors are preferred, and most preferred are iodine containing phosphors, because the oxosulfur functionalized polymer reducing agents stabilize against discoloration associated with halide containing phosphors, particularly iodine containing phosphors. The following description is primarily directed to iodine containing phosphors; however, the invention is not limited to them.

Examples of phosphors which include iodine are divalent alkaline earth metal fluorohalide storage phosphors containing iodine and alkali metal halide storage phosphors containing iodine. A mixture of phosphors, at least one of which contains iodine, could also be used, if desired, to form a panel having optimal properties for a particular application. Panel constructions containing more than one phosphor-containing layer are also possible, with iodine containing phosphors being present in one or more of the phosphor-containing layers.

The term "oxosulfur functionalized polymer reducing agent" or "oxosulfur functionalized polymer reducing agent for iodine" is used to designate a chemical species capable of reducing free (molecular) iodine according to the half-reaction:

$$I_2 + 2e^- \rightarrow 2I^-$$

or capable of reducing another halide according to the half-reaction:

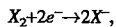

$$X_2 + 2e^- \rightarrow 2X^-,$$

where X is a halide.

The oxosulfur functionalized polymer reducing agents are polymers functionalized with oxosulfur reducing agents. Specific examples of the polymer reducing agents include compounds of the general formula:

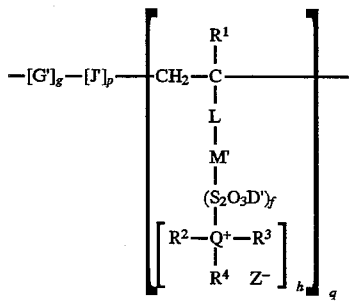

where:

Q is N or P;
$R^1$ is H or $CH_3$;
M' is a carbon chain and may be straight, branched or cyclic, for example,

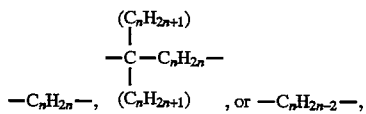

where n is 1 to 12; preferably is M' is $C_nH_{2n}$ where n is 1 to 6; L is

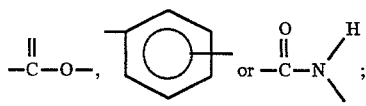

preferably

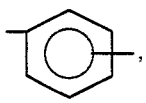

G' represents units of an addition polymerizable monomer containing at least two ethylenically unsaturated groups;
J' represents units of a copolymerizable ethylenically unsaturated monomer;
$R^2$, $R^3$ and $R^4$ are independently selected from the group consisting of carbocyclic groups and alkyl groups;
D' is a counter ion and may be simple inorganic cation such as an alkali metal or a complex organic or inorganic cation;
Z is $S_jO_kD''$— or $½S_jO_k^-$, where j and k are positive integers such that the ratio, j/k is defined by $0.25<j/k<1.0$;
g is 0 to 20 mole percent;
p is 0 to 90 mole percent;
q is 10 to 100 mole percent, preferably 50 to 100 mole percent;
where the addition of g, p and q equals 100 mole percent;
f is 0 or 1;
h is 0 or 1; and
f plus h is 1.

$S_jO_k$ is inclusive of species in which $S_jO_k$ is a free ion and species in which $S_jO_k$ is a charge bearing moiety covalently linked to another group. Therefore, the oxosulfur functionalized polymer reducing agents can consist of monomers having uncharged species or charged anions. Preferably j is 2 and k is 3, that is, $S_2O_3^{2-}$, or j is 4 and k is 6, that is, $S_4O_6^{2-}$. Most preferably j is 2 and k is 3.

D' can be selected on the basis of convenience and non-interference with the properties of the polymer. Examples of suitable counterions include $Li^+$, $Na^+$, $K^+$, $NH_4^+$ and $(ethyl)_4N^+$.

G' is a repeating unit of an addition polymerizable monomer containing at least two ethylenically unsaturated groups, such as vinyl groups generally having the structure:

$$(CH_2=\overset{R^6}{\underset{|}{C}})_rR^5$$

wherein r is an integer greater than 1 and preferably 2 or 3, each $R^6$ is independently selected from hydrogen and methyl and $R^5$ is a linking group comprising 1 or more condensation linkages such as amide, sulfonamide, esters such as sulfonic acid ester, arylene and the like, or a condensation linkage and an organic nucleus such as alkylene, such as methylene, ethylene, trimethylene, arylene, such as phenylene, phenylenedi(oxycarbonyl), 4,4'-isopropylidene bis(phenyleneoxycarbonyl), methylene(oxycarbonyl), ethylene di(oxycarbonyl), 1,2,3-propantriyltris(oxycarbonyl), cyclohexylene bis(methyleneoxycarbonyl), methyleneoxycarbonyl), ethylidyne trioxycarbonyl, and the like. The monomer used must be stable in the presence of strong alkali and must not be highly reactive so that hydrolysis does not occur during copolymerization.

Suitable examples of monomers from which the repeating units (G') are formed are divinylbenzene, allyl acrylate, allyl methacrylate, N-allylmethacrylamide, 4,4'-isopropylidenediphenyl diacrylate, 1,3-butylene diacrylate, 1,3-butylene dimethacrylate, 1,4-cyclohexylenedimethylene dimethacrylate, diethylene glycol dimethacrylate, diisopropylene glycol dimethacrylate, divinyloxymethane, ethylene diacrylate, ethylene dimethacrylate, ethylidene diacrylate, ethylidene dimethacrylate, 1,6-diacrylamidohexane, 1,6-hexamethylene diacrylate, 1,6-hexamethylene dimethacrylate, N,N'-methylenebisacrylamide, neopentyl glycol dimethacrylate, phenylethylene dimethacrylate, tetraethylene glycol dimethacrylate, tetramethylene diacrylate, tetramethylene dimethacrylate, 2,2,2-tricholoethylidene dimethacrylate, triethylene glycol diacrylate, triethylene glycol dimethacrylate, ethylidyne trimethacrylate, propylidene triacrylate, viny allyloxyacetate, vinyl methacrylate, 1-vinyloxy-2-allyloxyethane, and the like. Preferably the monomers from which the repeating units G' are formed are divinylbenzene, allyl acrylate, alyll methacrylate, 1,3-butylene dimethacrylate, 1,4-cyclohexylenedimethylene dimethacrylate, diethylene glycol dimethacrylate, methylene bisacrylamide and ethylene glycol dimethacrylate. More preferably G' is made from divinylbenzene, or ethylene glycol dimethacrylate. Ethylene glycol dimethacrylate is the most preferred monomer.

J' is a repeating unit of an addition polymerizable monomer such as ethylene, propylene, 1-butene, isobutene, 2-methylpentene, 2-methylbutene, 1,1,4,4-tetramethylbutadiene, tyrene, alpha-methylstyrene, monoethylenically unsaturated esters of aliphatic acids such as vinyl acetate, isopropenyl acetate, allyl acetate, etc.; esters of ethylenically unsaturated mono- or dicarboxylic acids such as methyl methacrylate, ethyl acrylate, diethyl methylenemalonate, etc.; monoethylenically unsaturated compounds such as acrylonitrile, allyl cynanide, and dienes such as butadiene and isoprene. A preferred class of ethylenically unsaturated monomers which may be used to form the ethenic polymers of this invention includes the lower 1-alkenes having from 1 to 6 carbon atoms; styrene, and tetramethylbutadiene and methyl methacrylate. Preferably J' is a styrene, acrylic or methacrylic esters, acrylonitrile, acrylic or methacrylic acid. More preferably J' is styrene.

Examples of $R^2$, $R^3$, and $R^4$ groups include: carbocyclic groups such as aryl, aralkyl, and cycloalkyl such as benzyl, phenyl, p-methyl-benzyl, cyclohexyl, cyclopentyl and the like and alkyl preferably containing from 1 to 20 carbon atoms, more preferably 1 to 12 carbon atoms, such as methyl, ethyl, propyl, isobutyl, pentyl, hexyl, heptyl, decyl and the like. Preferably $R^2$, $R^3$, or $R^4$ are methyl, ethyl or phenyl.

The weight average molecular weight of the polymer preferably ranges from $1\times10^5$ to $1\times10^6$ grams/mole.

The preferred compounds according to formula I are those when f=0 and h=1.

Examples of suitable oxosulfur functionalized polymeric reducing agents include:

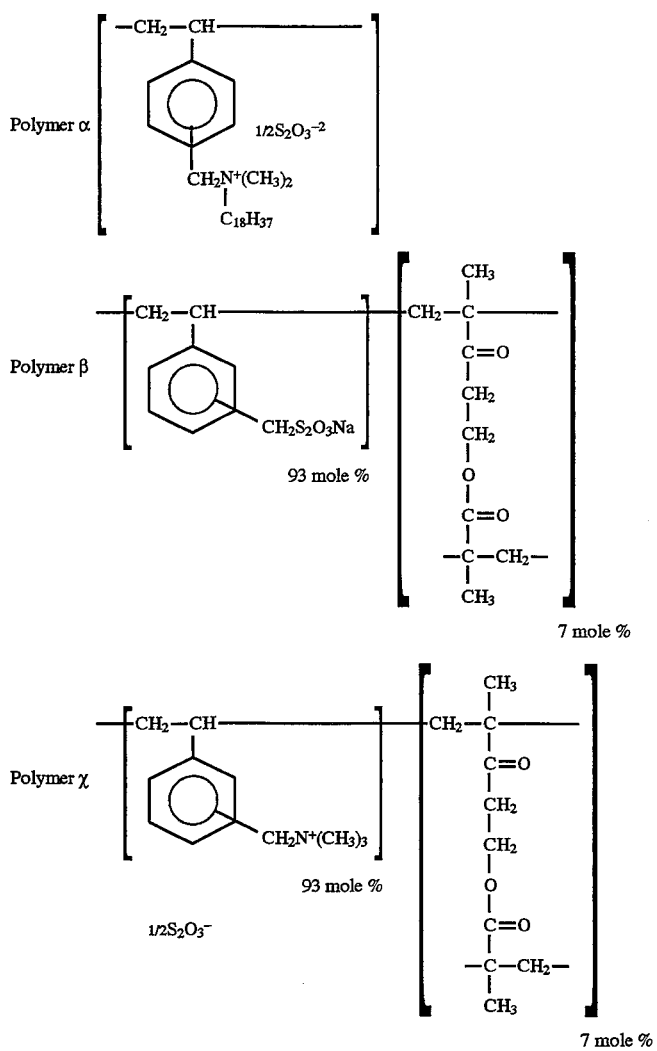

The polymers functionalized with oxosulfur reducing agents can be prepared by solution or emulsion polymerization. The polymeric materials according to this invention can be prepared by emulsion polymerizing a vinylbenzyl halide with a poly unsaturated monomer G' as described above and an α,β-ethylenically unsaturated monomer J' as described above, generally in the presence of an anionic surfactant such as sodium lauryl sulfate.

The above polymeric vinylbenzyl halide latex can be reacted with a tertiary amine or tertiary phosphine having the structure:

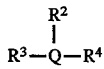

wherein $R^2$, $R^3$, $R^4$ and Q are described above, generally at temperatures of from about −20° C. to about 150° C. This produces a polymeric microgel latex which has a particulate character.

An alternate method of preparing the polymer is to emulsion polymerize an N-vinylbenzyl-N,N-dialkylamine monomer with monomers G' and J' as described above in the presence of an anionic surfactant and a redox free-radical initiator. The resulting polymer tertiary amine latex is reacted with an alkylating agent having the structure $R^3$-Z' wherein $R^3$ is as described above and Z' is a group which can be displaced to yield the anion $Z^-$, preferably $Z'^-$ is a halide such as chloride or an alkyl or aryl sulfonate group. This reaction can take place at temperatures from about −20° C. to about 150° C. The resulting polymeric latex can then be ion-exchanged using a diafiltration apparatus to replace Z' with Z as defined above. The formation of the latex is described in more detail in U.S. Pat. No. 3,958,995 incorporated herein by reference.

The monomers of the polymer reducing agent can be selected on the basis of convenience, non-toxicity, non-hygroscopicity, solubility in the solvent for a particular binder and non-interference with the desired characteristics of the panel produced. It is generally preferred that the oxosulfur functionalized polymer reducing agent and the product of its reaction with iodine of other halide be colorless, however, some coloration within a suitable wavelength range could be accommodated. It is generally preferred that the oxosulfur functionalized polymer reducing agents be soluble in a suitable solvent such that it can be dispersed in the binder on a substantially molecular basis. The oxosulfur functionalized polymer reducing agent should be further chosen such that it does not impart undesirable characteristics to the radiographic panel such as odor, and poor mechanical strength.

It is generally taught in the art that the degradation of image storage panels results from both oxidation and hydrolysis of the phosphor as a result of its exposure to air, heat and moisture. This process is thought to liberate intensely colored and highly light absorbing iodine molecules from the panel, which in turn, stain the panel and dramatically degrade its speed. The oxosulfur functionalized polymer reducing agents of the present invention are effective reducing agents for molecular iodine. For example when $S_jO_k$ is $S_2O_3^{2-}$, it rapidly reacts with iodine according to the following chemical equation:

$$S_2O_3^{2-} + I_2 \rightarrow 2I^- + S_4O_6^{2-}$$

The concentration of the oxosulfur functionalized polymer reducing agent, preferably located in the luminescent layer of the phosphor panel, should be an amount sufficient to increase the photostimulated luminescence of the phosphor panel as compared to a control panel which does not contain a reducing agent and/or stabilizing compound. There is theoretically no upper limit of the concentration of stabilizing compounds in the layers of the panel, however, deterioration of panel characteristics at very high concentrations of stabilizing compound is expected, if, by no other means than displacement of phosphor or binder. Convenient concentrations of the oxosulfur functionalized polymer reducing agent are a fraction or few weight percent relative to the weight of the phosphor, or a range of about 0.1 to about 10.0, preferably 0.1 to 4 weight percent relative to the weight of the phosphor (also referred herein as (wt/wt)%).

One or more oxsulfur functionalized polymer reducing agents can be used in combination with other reducing agents and/or stabilizing compounds, such as, oxosulfur reducing pigments, binder compatible oxosulfur reducing agents, epoxides, organotin compounds, phosphites, and metal salts of organic acids. The total concentration of the reducing agents and stabilizing compounds should not exceed 10 (wt/wt)%.

The oxosulfur functionalized polymer reducing agents can optionally serve as the binder for the luminescent layer; thereby eliminating the need for additional binders. In a preferred embodiment, the luminescent layer of the phosphor panel of the invention contains phosphor, the oxosulfur functionalized polymer reducing agent, a conventional polymeric binder to give it structural coherence and other addenda, if desired. In general the conventional binders useful in the practice of the invention are those traditionally employed in the art. Conventional binders are generally chosen from a wide variety of known organic polymers which are transparent to x-rays, stimulating, and emitted light. Conventional binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. These and other useful conventional binders are disclosed in U.S. Pat. Nos. 2,502,529; 2,887,379; 3,617,285; 3,300,310; 3,300,311; and 3,743,833; and in Research Disclosure, Vol. 154, February 1977, Item 15444, and Vol. 182, June 1979. Research Disclosure is published by Kenneth Mason Publications, Ltd., Emsworth, Hampshire P010 7DD, England. Particularly preferred conventional binders are poly(urethanes), such as those commercially available under the trademark Estane from Goodrich Chemical Co., the trademark Permuthane from the Permuthane Division of ICI, and the trademark Cargill from Cargill, Inc.

When used in combination with conventional binders, the oxosulfur functionalized polymer reducing agent is preferably binder compatible. The term "binder compatible" is used herein to indicate that the oxosulfur functionalized polymer reducing agent is not dispersed in particulate form in the binder, but rather is dispersed on a molecular basis or on a substantially molecular basis. Binder compatible is, for example, inclusive of what is sometimes referred to as a "solid solution". Binder compatible is also inclusive of a solid solution within one phase of a two binder system. When the oxosulfur functionalized polymer reducing agent and binder have solubility properties in common, the oxosulfur functionalized polymer reducing agent is usually binder compatible and the oxosulfur functionalized polymer reducing agent and binder can be dissolved in the same solvent and then solvent cast to form a single substantially uniform layer. In the phosphor panel, the oxosulfur functionalized polymer reducing agent and binder provide a solvent cast matrix for the phosphor and any other particulate addenda.

Any suitable ratio of phosphor to conventional binder can be employed. Generally thinner phosphor layers and sharper images are realized when a high weight ratio of phosphor to binder is employed. Preferred phosphor to conventional binder weight ratios are in the range of from about 7:1 to 25:1 for panel constructions intended to withstand commercial exposure repetitions without loss of structural integrity. In the case in which oxosulfur functionalized polymer reducing agents are combined with conventional binders the total weight of binders and polymers with respect to the phosphor should be in the range from 5:1 to 25:1 (phosphor:binders). For limited or single exposure applications it is, of course, appreciated that any minimal amount of binder consistent with structural integrity is satisfactory.

In particular embodiments of the invention, it may be desirable to add white pigment. Suitable pigments, are well known to those skilled in the art and include materials such as titania and barium sulfate. White pigments have been utilized in the art to increase resolution at the expense of speed.

In particular embodiments of the invention, the phosphor is a storage phosphor which is the product of firing starting materials comprising a combination of species characterized by the relationship:

$$MFX_{1-z}I_z \cdot uM^aX^a : yA : eQ : tD,$$

where M is selected from Mg, Ca, Sr, and Ba; X is selected from Cl and Br; $M^a$ is selected from Na, K, Rb, and Cs; $X^a$ is selected from Cl, Br, and I; A is selected from Eu, Ce, Sm, and Tb; Q is an oxide selected from BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; and D is selected from V, Cr, Fin, Fe, Co, and Ni. Numbers are represented by the following: z is from $1\times10^{-4}$ to 1, u is from 0 to 1, y is from $1\times10^{-4}$ to 0.1, e is from 0 to 1, or more preferrably from $1\times10^{-5}$ to 0.1, and t is from 0 to $1\times10^{-2}$. The same designations appearing elsewhere herein have the same meanings unless specifically stated to the contrary. Groups of materials, for example the materials defined by M, are to be understood as inclusive of combinations of materials in that group.

In some of those embodiments of the invention, the panel includes a divalent alkaline earth metal fluorohalide storage phosphor containing iodine which is the product of firing an intermediate, a combination of species characterized by the relationship:

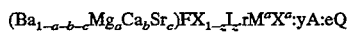

where X, $M^a$, $X^a$, A, Q, z, y, and e have the same meanings as in formula (1) and the sum of a, b, and c is from 0 to 0.4, and r is from $1\times10^{-6}$ to 0.1. In a particular embodiment of the invention, $M^a$ is potassium and the storage phosphor is further characterized as disclosed in U.S. patent application Ser. No. 300,116, filed Sep. 2, 1994 (now U.S. Pat. No. 5,464,568) by Joseph F. Bringley, Philip S. Bryan and Andrea M. Hyde, entitled: ALKALINE EARTH METAL FLUOROBROMOIODIDE STORAGE PHOSPHOR AND RADIATION IMAGE STORAGE PANEL, the disclosure of which is hereby incorporated herein by reference.

In a particular embodiment of the invention, the phosphor is produced utilizing an oxosulfur reducing agent containing storage phosphor intermediate, disclosed in U.S. application Ser. No. 300,113, filed Sep. 2, 1994, (now U.S. Pat. No. 5,507,967) by Joseph F. Bringley, Philip S. Bryan and Andrea M. Hyde, entitled: STABILIZED PHOSPHOR INTERMEDIATES, STORAGE PHOSPHORS, RADIATION IMAGE STORAGE PANELS, AND PREPARATION METHODS; (hereafter referred to as "Stabilized Phosphor Intermediates Application), the disclosure of which is hereby incorporated herein by reference. The stabilized phosphor intermediate disclosed therein and its resulting phosphor have increased photostimulated luminescence in comparison to unstabilized controls. It is expected that increased photostimulated luminescent provided thereby is cumulative with the increased photostimulated luminescent provided in the claimed invention.

Care is taken in the selection of inorganic cations so as to not cause deleterious effects on the phosphor produced. In the inventive phosphor of the Stabilized Phosphor Intermediates Application, the oxosulfur reducing agent is present in the unfired intermediate for the phosphor in an amount sufficient to increase relative photostimulated luminescence in the fired phosphor relative to the same phosphor absent said reducing agent for iodine. In a particular embodiment of the Stabilized Phosphor Intermediates Application, the phosphor has the general structure

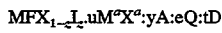

or

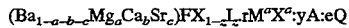

in which these formulas have the same meanings as discussed above and the oxosulfur reducing agent is present in the intermediates in a molar ratio of sulfur to alkaline earth metal of greater than $1\times10^{-4}$ and less than 0.020.

For the highest attainable speeds a white support, such as a titania or barium sulfate loaded or coated support is employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the conventional binder and/or the polymers of the present invention are chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. With storage panels, it is preferable to include a dye or pigment which absorbs some of the stimulating radiation, generally provided by a laser; but mostly reflects emitted light. U.S. Pat. No. 4,491,736 to Teraoka teaches the use of such materials in storage panels.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by Research Disclosure, Vol. 176, December 1978, Item 17643, Section XVII, and Research Disclosure, Vol. 184, August 1979, Item 18431, Section I.

An overcoat layer, although not required, is commonly located over the luminescent layer for humidity and wear protection. If the panel includes an overcoat layer, the oxosulfur funtionalized polymer reducing agents may be located in the overcoat layer or the luminescent layer or both. The oxosulfur functionalized polymer reducing agents may be admixed with conventional overcoat binders and used for the overcoat layer. Suitable concentrations of oxosulfur functionalized polymer reducing agents when mixed with an conventional overcoat binder are in the range from about 0.05 to 50% by weight binder. The overcoat layer comprises a binder chosen using the criteria described above for the conventional binder in the luminescent layer. It is understood that the oxosulfur functionalized polymer reducing agents, the conventional binder if used in the overcoat layer, and the conventional binder forming the matrix in which the phosphor particles are held, are preferably formed of transparent resins that do not interfere with the passage of x-rays or stimulating radiation or the emitted light from the phosphors. The overcoat binder can be the same binder as in the luminescent layer or different and can also be chosen from polymers useful for supports. Since it is generally required that the overcoat layer exhibits toughness and scratch resistance, polymers conventionally employed for film supports are favored. For example, cellulose acetate is an overcoat commonly used with the poly(urethane) binders. Overcoat polymers are often used also to seal the edges of the phosphor layer. In a preferred embodiment of the invention, the overcoat is produced in accordance with a U.S. Pat. No. 5,401,971 by Luther C. Roberts, entitled: OVERCOATED RADIATION IMAGE STORAGE PANEL AND METHOD FOR PREPARING RADIATION IMAGE STORAGE PANEL, the disclosure of which is incorporated herein by reference.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration, that is, to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

Any one or combination of conventional panel features compatible with the features described herein can, of course, be employed. Conventional storage panel constructions are disclosed in U.S. Pat. No. 4,380,702 to Takahashi et al, the disclosure of which is hereby incorporated by reference. Conventional intensifying panel constructions are disclosed in Research Disclosure, Vol. 184, August 1979, Item 18431, hereby incorporated herein by reference.

The radiographic panels of the invention are formed by conventional coating techniques. Phosphor powder, oxosulfur functionalized polymer reducing agents and other addenda are mixed with a solution of a resin binder material and coated by means such as blade coating onto a substrate. U.S. Pat. No. 4,505,989 to Umemoto et al, the disclosure of which is hereby incorporated herein by reference, describes suitable techniques known in the art for preparing an X-ray image storage panel.

The following Examples and Comparative Example are presented to further illustrate and elucidate some preferred modes of practice of the invention. Unless otherwise indicated, all starting materials were commercially obtained.

The X-ray storage phosphor $BaFBr_{.85}I_{.15}$:$0.001Eu^{2+}$ was prepared by the following general procedure:

In a 2000 ml beaker containing a Teflon coated magnetic stir bar, 269.54 grams of $BaBr_2.2H_2O$ and 62.22 grams of $BaI_2.2H_2O$ were dissolved in a 2 to 3 fold excess of distilled water and the solution filtered. To the filtered solution was then added 2.88 grams of fumed silica and 0.500 grams of $BaS_2O_3.H_2O$ followed by 0.088 grams KBr. 167.5 g of $BaF_2$ containing 0.002 moles of $EuF_2$ and 0.01 mol $CaF_2$ were then added to the solution slowly with vigorous stirring. Stirring was maintained for about 1 hour and the resulting slurry was then spray-dried through an air driven rotary atomizer at an inlet temperature of 350° C. and an outlet temperature of 110° C. The resulting white powder was then placed into alumina crucibles and fired at a temperature of 840° to 860° C. for 3.5 hours under flowing nitrogen. The phosphor powders, after being allowed to cool under nitrogen, were then ground and sieved through a 38 micron screen yielding the finished phosphor.

Preparation of Latex A

To a two liter three-necked flask equipped with a stirrer and condenser was added 588 ml of degassed distilled water and 2.3 grams of sodium lauryl sulfate. The flask was placed in a 60° C. bath. 0.09 grams of sodium metabisulfite and 1.44 grams of potassium persulfate were added followed by the contents of an addition flask containing a mixture of 161 ml of degassed distilled water, 171 grams of vinylbenzyl chloride, 16.5 grams of ethyleneglycol dimethacrylate, 7 grams of sodium lauryl sulfate, and 0.33 grams of sodium metabisulfite over a period of 45 minutes. After the addition was complete 0.04 grams of sodium metabisulfite and 0.14 grams of potassium persulfate were added. The resulting latex was stirred at 60° C. under nitrogen for 2 hours and then cooled to give a translucent latex.

Preparation of Polymer χ

To latex A was added 3 ml of 50% sodium hydroxide in 283 ml of distilled water followed by the addition of 290 grams of trimethylamine in 261 grams of isopropyl alcohol over a period of 90 minutes. The contents was stirred at 60° C. for 6 hours and then cooled to give a white dispersion. 500 grams of the above dispersion was added into the delivery system of a diafiltration apparatus. The diafiltration apparatus contained a 10,000 molecular weight cut off polysulfone diafiltration membrane. 1500 ml of a 10% solution of $Na_2S_2O_3$ were added dropwise. The polymer dispersion was circulated through the apparatus until the permeate contained no chloride ion. The polymer was then isolated by freeze drying under vacuum.

Preparation of Polymer α

To a 2 liter 3-necked flask equipped with a stirrer and condenser was added 40 ml of n-butanol, 20 grams of N-vinylbenzyl-N,N-dimethyl-N-octadecylammonium chloride, and 0.4 grams of 2,2'-azobis(2-methylpropionitrile). The solution was stirred under nitrogen at 80° C. for 16 hours to give a viscous solution. The solution was diluted with 100 ml of n-butanol and cooled to room temperature. The polymer was precipitated in 4 liters of acetone and dried in a vacuum oven. 1 gram of the above polymer was dissolved in 500 ml of ethanol and evaporated to dryness on a rotary evaporator. 10 grams of $Na_2S_2O_3$ in 400 ml of water was added to the flask and stirred for 16 hours. The resulting solid was filtered and added to 5 grams of $Na_2S_2O_3$ in 200 ml of water. The slurry was stirred for 16 hours and the solid collected by filtration. The solid was dried in a vacuum oven.

Preparation of Polymer β

20.0 grams of Latex A was introduced into a dialysis bag and followed by the addition of 10.0 grams of $Na_2S_2O_3.5H_2O$. The dialysis bag was then closed at the top and placed into a 500 ml Erlenmeyer flask and the flask filled with distilled water. After 12 hours, 5 additional grams of $Na_2S_2O_3.5H_2O$ were introduced into the dialysis bag and the water in the Erlenmeyer flask was replaced. After an additional 24 hours, the dialysis bag was removed and placed into a 400 ml beaker. The bag was then flushed with distilled water for 48 hours. The resultant thiosulfate functionalized polymer was isolated by freeze drying.

EXAMPLES 1-3 AND THE COMPARATIVE EXAMPLE

Image storage panels were prepared by the following general procedure. Phosphor $BaFBr_{.85}I_{.15}$.$0.001Eu^{2+}$ (99.00 grams) and oxosulfur functionalized polymer reducing agent (1.00 gram) were dispersed in a 13 (weight/weight)% solution of PERMUTHANE™ U-6366 polyurethane marketed by ICI Polyurethanes Group of West Deptford, N.J. in 93:7 (weight/weight) dichloromethane/methanol solvent. The phosphor to conventional binder ratio was 15:1. Knife-coatings were prepared on a polyethylene terephthalate support. The knife-coatings were allowed to air-dry to produce luminescent layers. After drying the completed storage panels were overcoated with a polymer solution of cellulose acetate in acetone. A Comparative Example image storage panel was prepared in an identical manner, except that no amount of oxosulfur functionalized polymer reducing agent was added.

The oxosulfur functionalized polymer reducing agent for Example 1 was Polymer α. The oxosulfur functionalized polymer reducing agent for Example 2 was Polymer β and the oxosulfur functionalized polymer reducing agent for Example 3 was Polymer χ.

The relative photostimulated luminescence (PSL) intensities of the image storage panels were measured by cutting 2.6 centimeter diameter disks from the panels, and simultaneously exposing the sample and the Comparative Example to filtered X-radiation. The X-ray source was a tungsten target tube operating at 70 kVp and 3.0 mA. The filtration consisted of a 3.5 centimeter thickness of aluminum. After exposure to X-rays, the samples and Comparative Example were stimulated with a 4-millisecond pulse at 633 nanometers from a 12 mW helium-neon laser. The stimulated emission was detected using a photomultiplier tube after passing through a Schott BG-25 filter. The responses were corrected for X-ray exposure variations by normalizing the measured response in each case to an internal standard. The PSL responses for the Examples are reported relative to the Comparative Example handled in an identical manner. The response of the Comparative Example in each case was arbitrarily set equal to 100. The measured PSL responses were corrected for variations in phosphor coverage by dividing by the coverage value determined for that particular disk.

The oxosulfur functionalized polymer reducing agents used to make the image storage panels of Examples 1 to 3 and the PSL responses for Examples 1 to 3 and the Comparative Example are listed in Table 1. From Table 1, it is observed that the addition of oxosulfur functionalized polymer reducing agents to panels containing $BaFBr_{.85}I_{.15}{:}0.001Eu^{2+}$ phosphor improves the photostimulated luminescence of the resulting radiographic phosphor panel.

TABLE 1

Effect of Oxosulfur Functionalized Polymer Reducing Agents on the PSL of Radiographic Phosphor Panels.

| Example Response | Oxosulfur Functionalized Polymer Reducing Agent | PSL |
| --- | --- | --- |
| 1 | polymer α | 174 |
| 2 | polymer β | 168 |
| 3 | polymer χ | 182 |
| Comparative Example | none | 100 |

What is claimed is:

1. A radiographic phosphor panel comprising a support and, overlying said support, a luminescent layer including phosphor crystals, a binder and an oxosulfur functionalized polymer reducing agent said oxosulfur functionalized polymer reducing agent having the following structure:

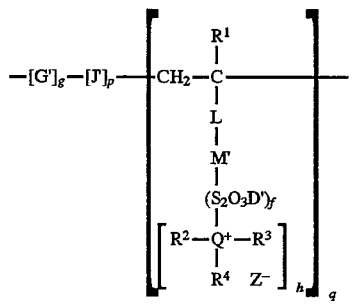

where:

Q is N or P;
$R^1$ is H or $CH_3$;
M' is a carbon chain;

L is

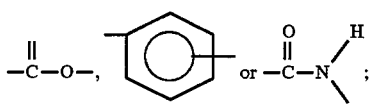

G' represents units of an addition polymerizable monomer containing at least two ethylenically unsaturated groups;

J' represents units of a copolymerizable ethylenically unsaturated monomer;

$R^2$, $R^3$ and $R^4$ are independently selected from the group consisting of carbocyclic groups and alkyl groups;

D' is a counter ion;

Z is $S_jO_kD'^-$ or $½S_jO_k^-$, where j and k are positive integers such that the ratio j/k is defined by 0.25<j/k<1.0;

g is 0 to 20 mole percent;
p is 0 to 90 mole percent;
q is 10 to 100 mole percent;
where g and p and q added equals 100 mole percent;
f is 0 or 1;
h is 0 or 1; and
f plus h is 1.

2. The radiographic phosphor panel of claim 1 wherein D' is selected from the group consisting of $Li^+$, $Na^+$, $K^+$, $NH_4^+$ and $(ethyl)_4N^+$.

3. The radiographic phosphor panel of claim 1 wherein h is 1, j is 2 and k is 3; or h is 1, j is 4 and k is 6.

4. The radiographic phosphor panel of claim 1 wherein f is 1.

5. The radiographic phosphor panel of claim 1 wherein q is 50 to 100 mole percent.

6. The radiographic phosphor panel of claim 1 wherein M' is $C_nH_{2n}$ and n is 1 to 6.

7. The radiographic phosphor panel of claim 1 wherein L is

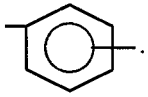

8. The radiographic phosphor panel of claim 1 wherein G' is a unit of a monomer, said monomer selected from the group consisting of divinylbenzene, allyl acrylate, allyl methacrylate, N-allylmethacrylamide, 4,4'-isopropylidenediphenyl diacrylate, 1,3-butylene diacrylate, 1,3-butylene dimethacrylate, 1,4-cyclohexylenedimethylene dimethacrylate, diethylene glycol dimethacrylate, diisopropylene glycol dimethacrylate, divinyloxymethane, ethylene diacrylate, ethylene dimethacrylate, ethylidene diacrylate, ethylidene dimethacrylate, 1,6-diacrylamidohexane, 1,6-hexamethylene diacrylate, 1,6-hexamethylene dimethacrylate, N,N'-methylenebisacrylamide, neopentyl glycol dimethacrylate, phenylethylene dimethacrylate, tetraethylene glycol dimethacrylate, tetramethylene diacrylate, tetramethylene dimethacrylate, 2,2,2-tricholoethylidene dimethacrylate, triethylene glycol diacrylate, triethylene glycol dimethacrylate, ethylidyne trimethacrylate, propylidene triacrylate, viny allyloxyacetate, vinyl methacrylate, and 1-vinyloxy-2-allyloxyethane.

9. The radiographic phosphor panel of claim 1 wherein J' is a unit of a monomer, said monomer selected from the group consisting of ethylene, propylene, 1-butene, isobutene, 2-methylpentene, 2-methylbutene, 1,1,4,4-tetramethylbutadiene, tyrene, alpha-methylstyrene, monoethylenically unsaturated esters of aliphatic acids, esters of ethylenically unsaturated mono- or dicarboxylic acids, and monoethylenically unsaturated compounds.

10. The radiographic phosphor panel of claim 1 wherein $R^2$, $R^3$ and $R^4$ are independently selected from the group consisting of benzyl, phenyl, p-methyl-benzyl, cyclohexyl, cyclopentyl, methyl, ethyl, propyl, isobutyl, pentyl, hexyl, heptyl, and decyl.

11. The radiographic phosphor panel of claim 1 wherein said oxosulfur functionalized polymer reducing agent has a molecular weight from $1 \times 10^5$ to $1 \times 10^6$ grams/mole.

12. The radiographic phosphor panel of claim 1 wherein said oxosulfur functionalized polymer reducing agent is selected from the group consisting of

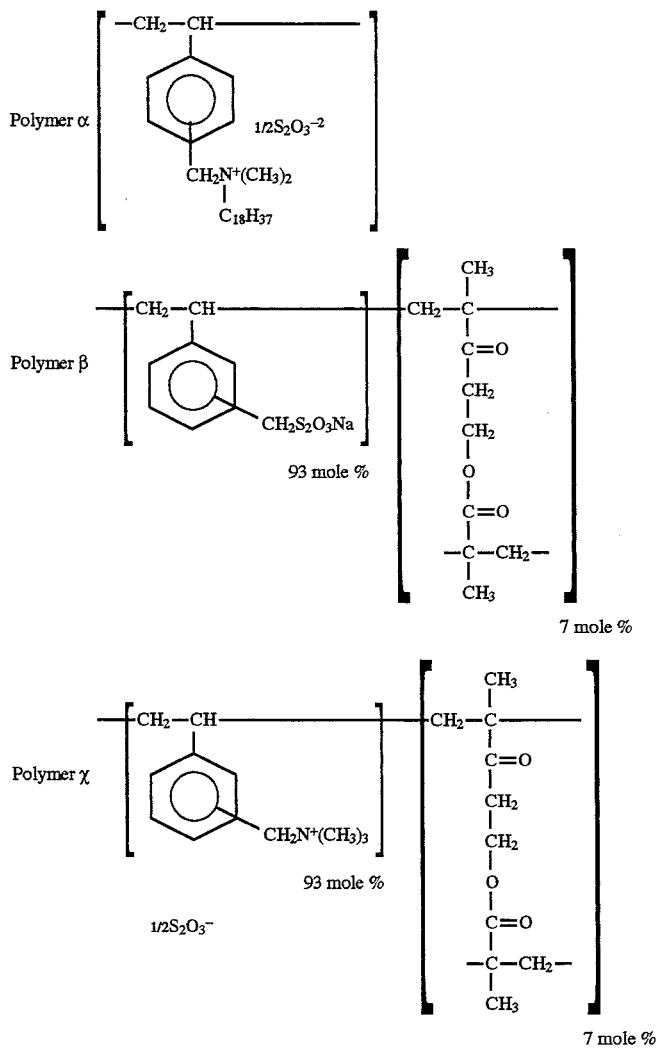

13. The radiographic phosphor panel of claim 1 wherein said radiographic phosphor panel is a radiation image storage panel.

14. The radiographic phosphor panel of claim 1 wherein said phosphor crystals contain halide.

15. The radiographic phosphor panel of claim 1 wherein said phosphor crystals consist essentially of the product of firing a combination of species characterized by the relationship:

$$MFX_{1-z}I_z \cdot uM^aX^a:yA:eQ:tD$$

wherein

M is selected from the group consisting of Mg, Ca, Sr, and Ba;

X is selected from the group consisting of Cl and Br;

$M^a$ is selected from the group consisting of Na, K, Rb, and Cs;

$X^a$ is selected from the group consisting of F, Cl, Br, and I;

A is selected from the group consisting of Eu, Ce, Sm, and Tb;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;

D is selected from the group consisting of V, Cr, Mn, Fe, Co, and Ni;

z is from $1 \times 10^{-4}$ to 1;

u is from 0 to 1;

y is from $1\times10^{-4}$ to 0.1;

e is from 0 to 1; and t is from 0 to $10^{-2}$.

16. The radiographic phosphor panel of claim 15 wherein said oxosulfur functionalized polymer reducing agent for iodine is selected from the group consisting of

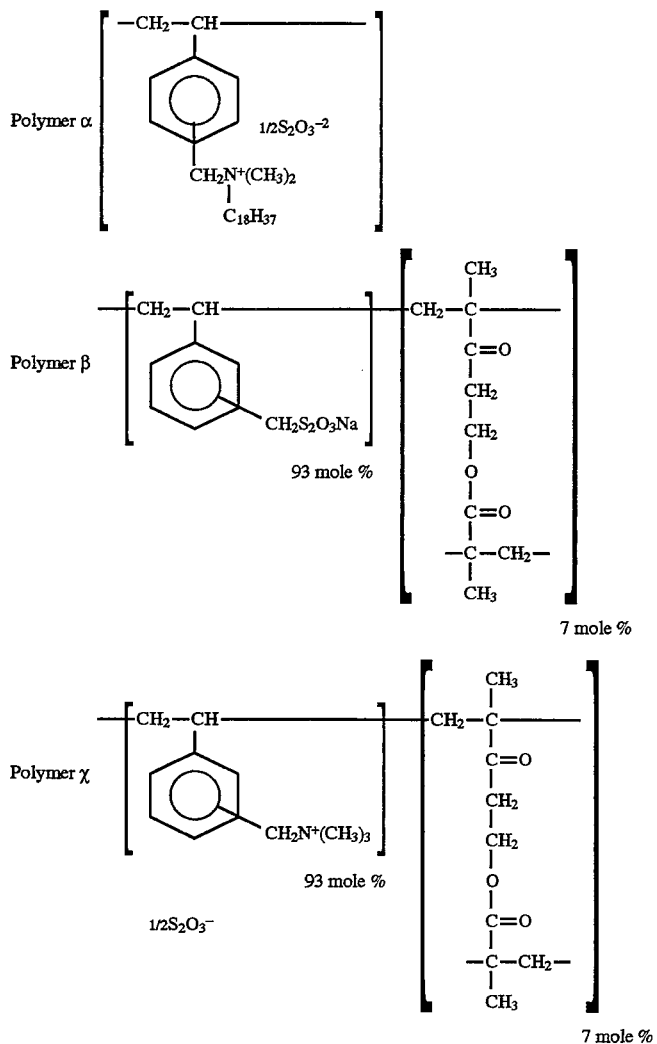

17. A radiographic phosphor panel according to claim 1 additionally including an overcoat layer including binder overlaying said luminescent layer.

18. The radiographic phosphor panel of claim 17 wherein said phosphor crystals are selected from the group consisting of divalent alkaline earth metal fluorohalide phosphors containing iodine and alkali metal halide phosphors containing iodine.

19. The radiographic phosphor panel of claim 17 wherein said phosphor crystals consist essentially of the product of firing a combination of species characterized by the relationship:

$$(Ba_{1-a-b-c}Mg_aCa_bSr_c)FX_{1-z}I_z \cdot rM^aX^a{:}yA{:}eQ$$

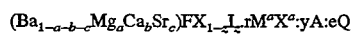

wherein

X is selected from the group consisting of Cl and Br;

$M^a$ is selected from the group consisting of Na, K, Rb, and Cs;

$X^a$ is selected from the group consisting of F, Cl, Br, and I;

A is selected from the group consisting of Eu, Ce, Sm, and Tb;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;

a+b+c is from 0 to 0.4;

z is from $1\times10^{-4}$ to 1;

r is from $1\times10^{-6}$ to 0.1;

y is from $1\times10^{-4}$ to 0.1;

e is from $1\times10^{-5}$ to 0.1.

* * * * *